Jan. 5, 1932. J. V. PETRELLI 1,839,991
REVERSE GEAR
Filed April 9, 1928  3 Sheets-Sheet 1

Jan. 5, 1932.  J. V. PETRELLI  1,839,991
REVERSE GEAR
Filed April 9, 1928    3 Sheets-Sheet 2
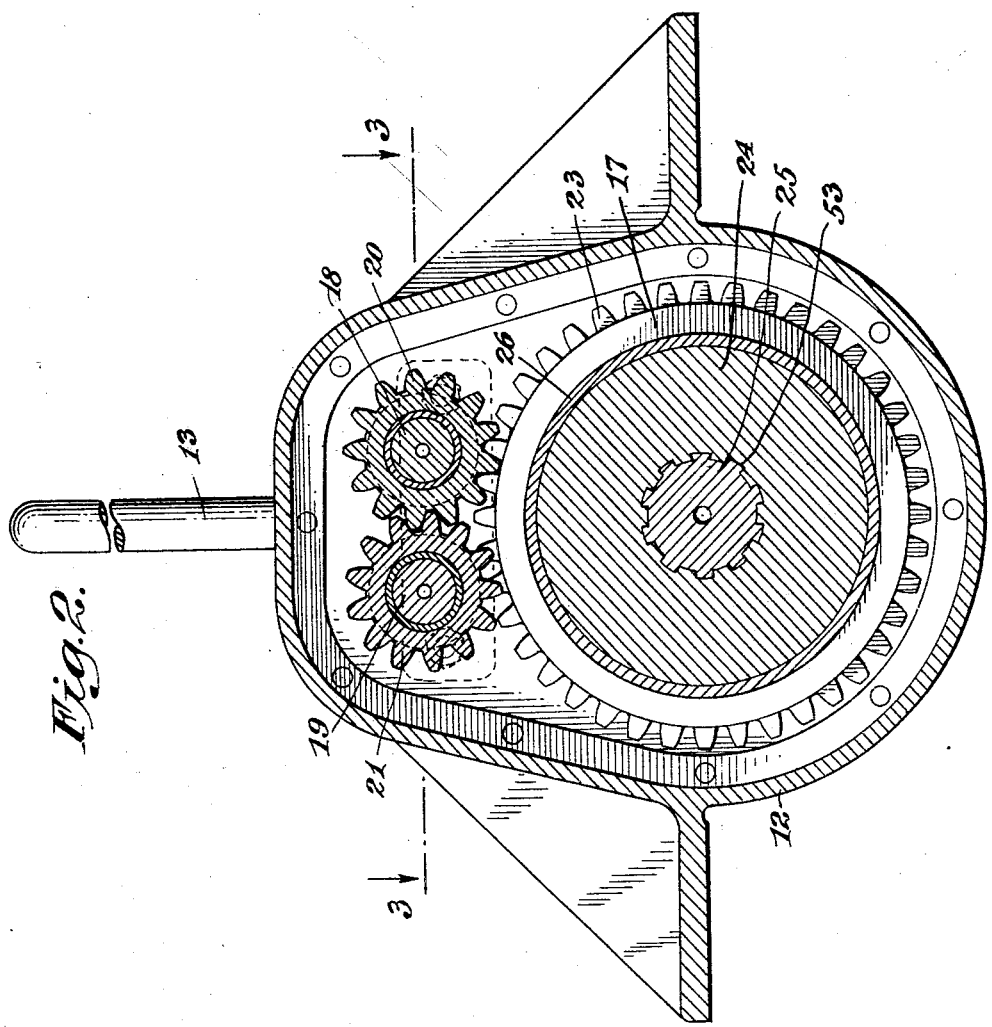

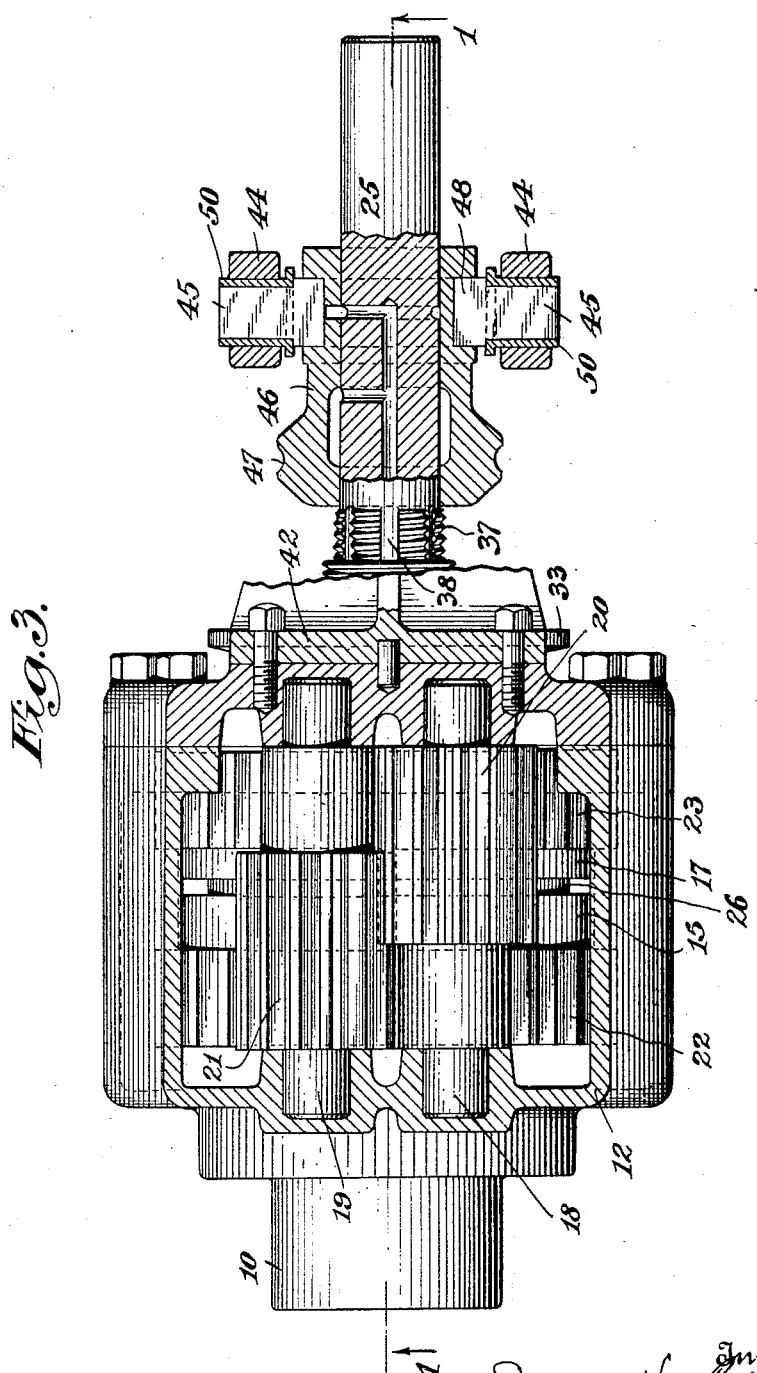

Patented Jan. 5, 1932

1,839,991

UNITED STATES PATENT OFFICE

JOSEPH V. PETRELLI, OF NEW ROCHELLE, NEW YORK

REVERSE GEAR

Application filed April 9, 1928. Serial No. 268,783.

This invention relates to a combination reversing gear and clutch and has for its object to provide such a mechanism which is rugged, compact, simple, and inexpensive. Another object is to provide a device of this class which is especially adapted for marine purposes. A further object is the provision of friction discs to distribute the wear and prolong the clutch life in the above type mechanism.

According to this invention two spaced simultaneously oppositely rotating clutch members are provided with a shiftable clutch part between them for engagement with either. Means are provided to adjust the cooperative pressure on said shiftable clutch part in either direction. A housing is provided to enclose the clutch members and clutch part and this means for varying the axial thrust on the clutch part is made adjustable from outside said housing. Means are also provided to prevent transmission of any unbalanced thrusts to the housing or to the driving or driven shafts connected to said clutch part and clutch members.

Referring to the drawings:

Fig. 2 is a section on the line 2—2 of Fig. 1;

Fig. 3 is a section on the line 3—3 of Fig. 2.

Figure 1:
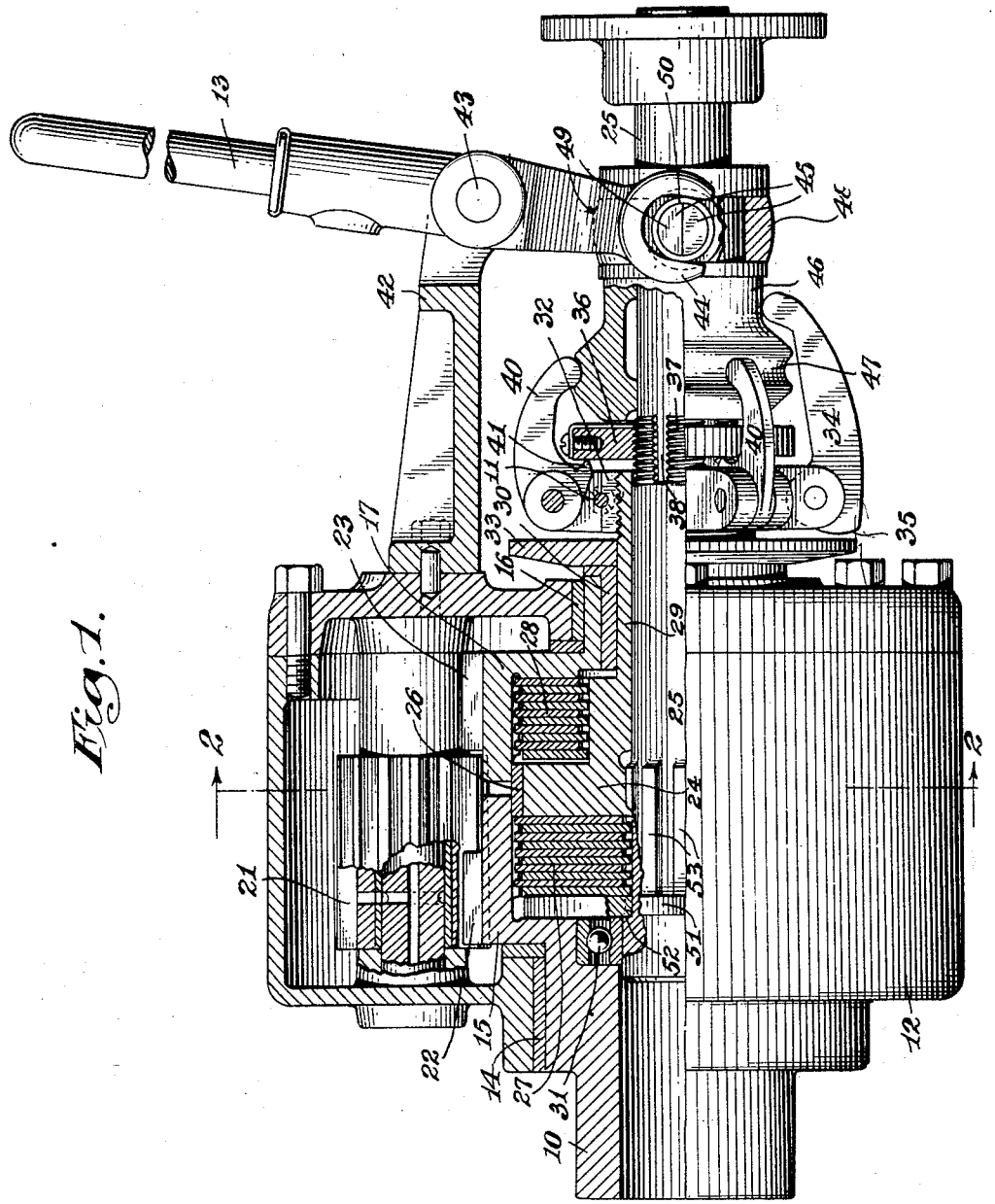
Fig. 1 is a longitudinal view partly in section of one embodiment of this invention.

The embodiment illustrated is especially adapted for marine purposes when the shaft 10 is connected with the motor or engine while the driven shaft 25 is connected to the propeller. A housing 12 encloses a combined reversing mechanism and clutch actuated by the control handle 13. A clutch member 15 on the shaft 10 is provided with a bearing 14 while the opposite cup-shaped clutch member 17 of somewhat similar cross section is provided with a bearing 16. Journalled in the housing 12 above these clutch members 15 and 17 are the shafts 18 and 19 carrying gears 20 and 21 which inter-mesh and each gear engages teeth on one of the clutch members. As shown in Fig. 3 the gears 20 and 21 inter-mesh in a space between the teeth on said clutch members, the gear 20 meshing with the teeth 23 on clutch member 17 while the gear 21 engages the teeth 22 on the clutch member 15 so that these clutch members simultaneously rotate in opposite directions. Within the cup-shaped clutch members 15 and 17 is a shiftable clutch part 24 for cooperation with either of said clutch members. This clutch part is splined on the driven shaft 25. Around the periphery of the shiftable clutch part 24 is provided bearing metal 26 which assists in supporting the adjacent end portions of said clutch members. Between the clutch part 24 and clutch member 15 are a series of friction discs alternate ones being splined to the shaft 25 while the others are splined to the clutch member 15 as illustrated whereby these discs must rotate with the shaft 25 and clutch part 15. The set of discs 27 is for direct drive between the engine and propeller while on the opposite side of the shiftable clutch part 24 is another set of discs 28 half of which are splined to the clutch part 24 or its extension 29 while the alternate ones or other half are similarly splined to the clutch part 17. This last set of discs 28 when compressed transmit motion from the clutch member 17 to the clutch part 24 for reversal of the propeller and since this set of discs is not used as much as the first set 27 their area is less. The extension 29 on the clutch part 24 is journalled within a bearing 30 inside the clutch member 17 and bearing 16. As the shaft 25 is within this extension and rotates therewith it will be seen that this bearing 30 is likewise for the shaft 25. The other end of the shaft is supported by the ball bearing 31 within the clutch member 15.

Threaded on the extension 29 is a thrust nut 32. A thrust collar 33 is slidable over the extension 29 and abuts against the bearing 30. For increasing the spacing between thrust nut 32 and member 33 are provided levers 34 which when opened cause their cam surfaces 35 to engage the thrust member 33 and shift the clutch part 24 to the right in Fig. 1 compressing the set of discs 28 and causing the propeller to reverse. Another thrust nut 36 engages the threads 37 on the shaft 25. These threads are slotted at 38 so that some form of key or other locking means may be retained in the slot 38 to prevent the nut 36 from rotating. Another set of levers 40 are also pivoted to the thrust nut 32 and when moved outwardly to a position shown in Fig. 1 cause the short arms 41 to engage the thrust nut 36 and shift the clutch part 24 to the left in Fig. 1 compressing the discs 27 and causing the propeller to be driven ahead. Bolted or otherwise secured to the housing 12 is a support arm 42 to which is pivoted at 43 the control handle 13. The lower end of said handle is bifurcated to extend around the driven shaft and each end shaped as shown at 44 to engage the projections 45 on the shiftable sleeve 46 for operating the levers 34 or 40 as desired. This sleeve is provided with an enlarged portion having a groove 47 therein. The projections 45 are formed in two parts the lower half 48 and the upper half 49 fitting within their groove in the sleeve so that the same is simpler to construct than if the projections were integral with the sleeve. A retaining ring 50 surrounds the projections 45 and holds their upper and lower halves together.

Adjacent the ball bearing on the shaft 25 is provided a shoulder 52 against which presses the thrust collar 51 splined to the shaft 25. There is clearance between this collar and the adjacent clutch member 15 although such can not so readily be shown on the drawing. The purpose of this collar is to oppose the axial thrust of the clutch part 24 on the discs 27 and transmit the thrust to the shaft 25 so that there is no undue friction from unbalanced thrusts on the housing 12 or clutch member 15. The splines which prevent rotation between the shaft 25 and the thrust collar 52, discs 27 and clutch part 24, are shown at 53 in Fig. 1.

In operation the driving shaft 10 causes clutch member 15 with which it is directly connected to rotate and from the teeth 22 on clutch member 15 motion is transmitted to the gear 21, thence to the gear 20, thence through the teeth 23 to the clutch member 17, so that both clutch members simultaneously rotate in opposite directions. To drive the propeller in a forward direction the control handle 13 is moved to the right in Fig. 1 which shifts the sleeve 46 to the left causing the levers 40 to be moved outwardly away from the driven shaft as they engage the groove 47. This outward movement of the levers 40 raises the short arms 41 into engagement with the thrust nut 36 and causes the thrust nut 32 to be moved to the left in Fig. 1 which shifts the clutch part 24 to the left compressing the discs 27 against the thrust collar 52. To reverse the propeller the control handle 13 is moved to the left in Fig. 1 which shifts the sleeve 46 to the right causing the levers 34 to move outwardly away from the shaft 25 and since these levers are pivoted to the thrust nut 32 as illustrated their cam surfaces 35 engage the thrust member 33 causing the shiftable clutch part 24 to be moved to the right compressing the disc 28 against the clutch member 17, its extension and the thrust member 32, so that no thrust is transmitted to the housing. By adjusting the nuts 32 and 36 the spacing between nut 32 and thrust member 33 can be adjusted and thus adjust the pressure on the discs 28. Adjustment of the nut 36 with respect to the nut 32 varies the pressure on the discs 27. The nut 32 is preferably slotted and provided with an appropriate locking means such as the clamp screw 11. With the control handle 13 in substantially upright position the sleeve 46 is moved to a position in which neither of the levers 40 nor 34 are actuated and the clutch part 24 is held in a neutral position not compressing either set of discs 27 or 28 with the result that the driven shaft 25 does not rotate. The shiftable clutch part as shown in Fig. 1 is in position compressing the discs 27 and driving the propeller in a forward direction.

For purposes of lubrication the gears 20 and 21 and their shafts are provided with oil passages illustrated so that these gears and likewise the discs 27 and 28 may rotate in oil.

While the clutch part 24 is not actually pressed against the clutch member 15 nevertheless since pressure on this clutch part results in its driving engagement with either clutch member it is believed accurate to say that the clutch part is pressed into engagement with either clutch member even though there is no unbalanced thrust transmitted to either of these clutch members. Inasmuch as the clutch part 24 is splined on the shaft 25 the discs 27 are recited as having their alternate numbers keyed to the clutch part since functionally they must rotate with this clutch part.

The embodiment illustrated shows a reverse gear particularly adapted to marine work, but it is obvious that the invention can be applied wherever a reverse gear is wanted.

I claim:

1. The combination with a shaft, of a shiftable extension thereon, a shiftable sleeve also on said shaft and provided with cam surfaces, an abutment adjacent said extension, and means on said extension for engagement with said abutment and with the cam surfaces of said sleeve for shifting said extension with respect to said shaft in either direction with greater force than is applied to said sleeve.

2. The combination with a shaft, of a shiftable sleeve thereon provided with cam surfaces, an extension also on said shaft, a nut threaded on said extension and having at least two sets of levers pivotally mounted thereon, an abutment over said extension and fixed against shifting with respect to said shaft, an abutment nut threaded on said shaft on the opposite side of said extension nut from said abutment, one set of levers on said extension nut being of a length and shape to engage said sleeve and abutment for shifting said extension on movement of said sleeve in one direction, the second set of levers on said extension being of a different length than the first mentioned set and for cooperation with other cam surfaces on said sleeve and shaped to engage said abutment nut for shifting said extension in the opposite direction.

3. In reversing gearing, the combination of a driving member, a driven shaft, a sleeve shiftable and splined thereon, a member revoluble on the sleeve, gears on the driving member and said revoluble member, pinions operatively connecting said gears, a clutch member on said sleeve, a set of clutch discs intermediate said clutch member and the driving member, another set of clutch discs intermediate said clutch member and the revoluble member, a thrust collar in movable relation to said sleeve, a thrust collar fixed on the shaft, an operating member fixed on said sleeve between said collars, a shifter, and two sets of dogs on said operating member actuated by the shifter and cooperating respectively with the two thrust collars to move the sleeve in opposite directions and effect driving through the respective sets of clutch discs.

4. In reversing gearing, the combination of a driving member, a driven shaft, a sleeve shiftable and splined thereon, a member revoluble on the sleeve, gears on the driving member and said revoluble member, pinions operatively connecting said gears, a clutch member on said sleeve, a set of clutch discs intermediate said clutch member and the driving member, another set of clutch discs intermediate said clutch member and the revoluble member, a thrust collar in movable relation to said sleeve, a thrust collar fixed on the shaft, an operating member fixed on said sleeve between said collars, a shifter, and two sets of dogs on said operating member actuated by the shifter and cooperating respectively with the two thrust collars to move the sleeve in opposite directions and effect driving through the respective sets of clutch discs, each set of dogs having cam members to cooperate with the respective thrust collars.

In testimony whereof I affix my signature.

JOSEPH V. PETRELLI.